Dec. 25, 1962  Q. A. HANSEN  3,069,929
AUTOMOTIVE DEVICE
Filed Jan. 7, 1960  5 Sheets-Sheet 1 fig. 1

INVENTOR.
QUINTEN A. HANSEN
BY
Woodhams, Blanchard and Flynn
ATTORNEYS

Dec. 25, 1962  Q. A. HANSEN  3,069,929
AUTOMOTIVE DEVICE

Filed Jan. 7, 1960  5 Sheets-Sheet 2

INVENTOR.
QUINTEN A. HANSEN
BY
Woodhams, Blanchard & Flynn
ATTORNEYS

Dec. 25, 1962

Q. A. HANSEN 3,069,929

AUTOMOTIVE DEVICE

Filed Jan. 7, 1960

INVENTOR.
QUINTEN A. HANSEN

BY
Woodhams, Blanchard & Flynn
ATTORNEYS

Dec. 25, 1962  Q. A. HANSEN  3,069,929
AUTOMOTIVE DEVICE

Filed Jan. 7, 1960  5 Sheets-Sheet 5 fig. 11 fig. 10

INVENTOR.
QUINTEN A. HANSEN
BY
Woodhams Blanchard & Flynn
ATTORNEYS 3,069,929
AUTOMOTIVE DEVICE
Quinten A. Hansen, Franksville, Wis., assignor, by mesne assignments, to Eaton Manufacturing Company, Cleveland, Ohio, a corporation of Ohio
Filed Jan. 7, 1960, Ser. No. 1,053
11 Claims. (Cl. 74—785)

This invention relates to a planetary transmission structure and it relates particularly to clutch structure utilized therein, which clutch structure permits a smooth transition from one ratio to a different ratio under conditions of heavy load.

It has long been conventional in the use of planetary gear systems to have various clutching devices provided between the respectively rotatable and nonrotatable, or differentially rotatable, parts of a planetary system in order to control the relative rotation of such parts with respect to each other and also to provide power or manually (including pedally) operated means for actuating said clutches. These clutch structures have conventionally included various cones, discs, and band clutches as well as other engageable and disengageable apparatus, and many types of actuating means for said clutch structures have previously been used. However, many of the prior devices have involved relatively complicated mechanical control devices and they have, particularly where a clutch structure has been placed inside another mechanism, required clutch actuating mechanism involving both high initial expense and high maintenance costs.

Further, where such planetary transmissions are to be used in high load, low speed applications, such as dirt moving equipment or heavy trucks, it is essential that the flow of power through the clutch be interrupted for only a minimum period of time. Thus, the interval of time between the release of the clutch determining one gear ratio in the planetary transmission and the engagement of the clutch determining another gear ratio should be kept as small as possible. On the other hand, if in an attempt to maintain this interval at a minimum there is actually created an appreciable amount of overlap between the disengagement of one clutch and the engagement of another clutch, then there may be opposition between said clutches, which has in the past often resulted in a jerkiness or grabbiness in operation and unnecessary and serious wear of the friction surfaces.

Another problem present with many types of planetary transmissions is that in an attempt to minimize the space occupied by the transmission, the clutching devices are often located in the same housing with the gear portions of the transmission. This normally means that lubricant required for the gear portion of the transmission will also enter between frictional surfaces of the clutch and materially reduce their frictional characteristics. Nevertheless, if a planetary transmission could be devised in which the frictional surfaces are kept dry, or substantially dry, a much more effective clutching engagement would take place and, as a result, both the size and number of the frictionally engaging devices could be materially reduced as compared to the frictional devices required when they are lubricated. Thus, the overall size and weight of the transmission would be correspondingly further reduced.

A still further problem in the design of planetary transmissions is to provide control structure for the clutch mechanism which is sufficiently accessible to outside control so that complicated structure for effecting said clutch control may be avoided. Suitable means for this purpose have been provided in the application of Willard F. Meyers, Serial No. 622,860, now Patent No. 2,918,832, entitled, "Automotive Device" and assigned to the same assignee as the present application, and it is accordingly desired to maintain the advantageous features of said Meyers' transmission in the transmission capable of meeting the other above discussed problems.

Accordingly, the objects of the invention are:

(1) To provide a planetary transmission minimizing the interruption in power flow during a shift from one ratio to another ratio and yet without such overlap in engagement of the clutches as to cause a rough operation and/or excessive clutch wear.

(2) To provide a planetary transmission construction as aforesaid, occupying a minimum amount of space.

(3) To provide a planetary transmission, as aforesaid, having frictionally engaging clutches in which the frictional surfaces of said clutches will not be contacted by an appreciable amount of lubricant and yet wherein the gears and bearings of the apparatus may be fully and adequately lubricated.

(4) To provide a planetary transmission, as aforesaid, in which the clutching devices are isolated from the gears of the transmission sufficiently that a minimum amount of, and preferably no, lubricant from the gear section of the transmission will contact the frictional surfaces of said frictional devices.

(5) To provide a planetary transmission, as aforesaid, having a recognizable degree of overlap between the release of one clutching system and engagement of the other clutching system but without causing an appreciably rough operation of the apparatus.

(6) To provide a planetary transmission, as aforesaid, wherein the engaging one of a pair of clutches, that is the clutch which is engaging while the other clutch is disengaging, will do so progressively so that there is actually no interruption of power transmission through the apparatus but so that there will be only minor opposition between said clutches and thereby no appreciable roughness, jerkiness or grabbiness in the transition from one gear ratio to another.

(7) To provide a transmission, as aforesaid, which will occupy a minimum of space, both axially and radially.

(8) To provide a planetary transmission, as aforesaid, wherein one set of clutches is located radially inside of the other whereby to minimize the axial length of the device.

(9) To provide a planetary transmission, as aforesaid, of such structural simplicity as to minimize both its initial cost and its maintenance cost.

Other objects and purposes of the invention will be apparent to persons acquainted with devices of this general type upon reading the following specification and inspection of the accompanying drawings.

In the following description, certain terminology will be used for convenience which will be recognized as for convenience only and as having no limiting significance. For example, the terms "upward" and "downward" and derivatives thereof and words of similar import will refer to directions taken in connection with the drawings with respect to which said terminology is used. Similarly, the terms "rightward" and "leftward" and derivatives thereof and words of similar import will also be taken in connection with the drawings. The terms "forward" and "rearward" and derivatives thereof and words of similar import will refer to the position of normal use in an automotive vehicle, the leftward side in FIGURE 2 being the forward, or power input, end. Said terms "inward" and "outward" and derivatives thereof and words of similar import will refer to directions toward and away from the geometric center of the apparatus.

General Description

In general, the invention consists of arranging the clutches concentrically with respect to each other and in substantially the same axial location for minimizing the axial distance required thereby. The movable clutch plates in both sets of clutches are mounted on supports which extend radially from near the center of the apparatus. By so mounting the clutch plates, a partition may and does extend from the outer casing of the transmission toward the center of the apparatus and is effectively sealed at the center of the apparatus so that lubricant may be retained in the gear section of the transmission and no appreciable amount of such lubricant will enter into the clutch portion from the gear position of the transmission.

In addition, the close proximity to each other of the two sets of clutch plates makes it possible to provide mechanism interrelating them sufficiently that pressure will be applied progressively to one set of such clutch plates as the other set commences to release, particularly as the apparatus enters into its low ratio condition, thereby providing sufficient overlap in the action of said clutches to insure against an interruption of flow of power through the transmission but at the same time to avoid any jerkiness or grabbiness in the operation of the apparatus.

Detailed Description

Figure 1:
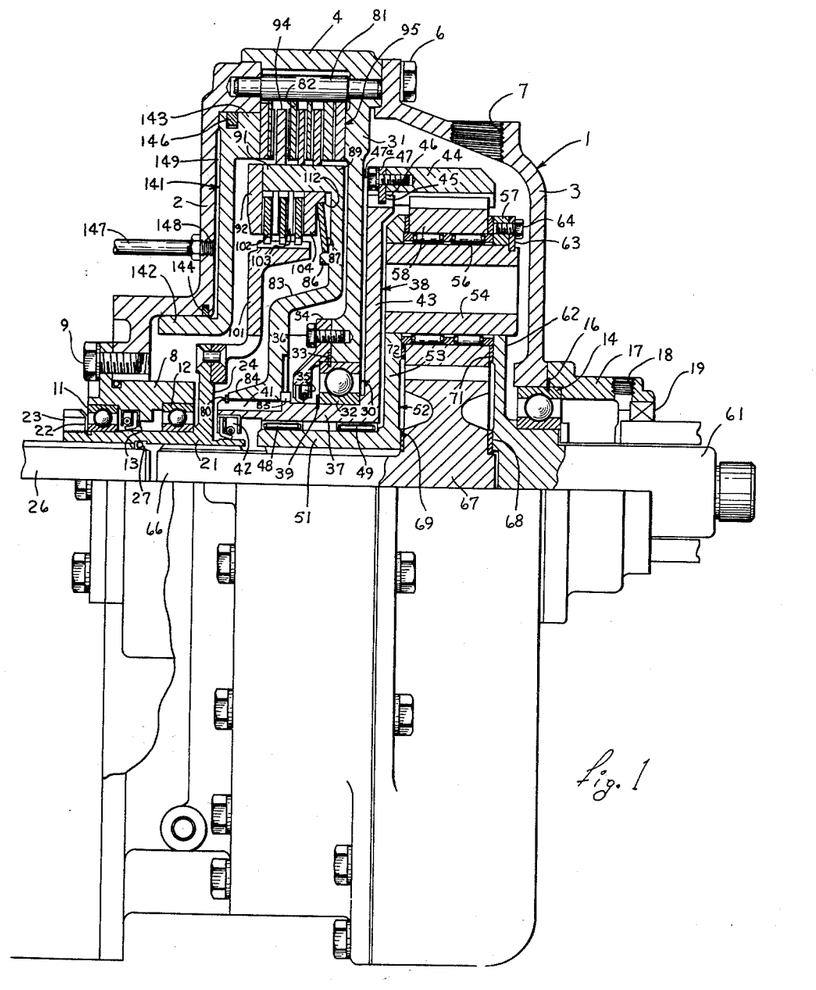
FIGURE 1 is a side view, partially in central section, of a transmission embodying the invention.

Referring now to the drawings, the casing 1 includes a frontward portion 2, a rearward portion 3 and a central portion 4 interposed between and connecting said frontward and rearward parts of the casing 1. Said parts are suitably interconnected in any convenient manner, as by the screws 6. A suitably threaded opening 7 is provided for introducing lubricant into the rearward portion 3 of the casing and a suitable drain opening (not shown) is provided in any conventional manner for draining such lubricant. A forward bearing retainer 8 is held in any convenient manner, as by the screws 9, in the forward end of the forward portion 2 of the casing 1 and said retainer 8 supports bearings 11 and 12 whose functions will be described further hereinafter. A grease seal 13 is provided immediately behind the bearing 11.

A rearward bearing 14 is located within the rearward portion 3 of the casing 1 and is held in place by the lock ring 16 which is in turn held between said rearward portion 3 and a cap 17, said cap being fastened to said rearward portion in any convenient manner, such as by screws (not shown). A further grease opening 18 is provided through the cap 17 and a grease seal 19 is provided for retaining lubricant within said cap.

Turning now to the operating structure of the transmission, an input sleeve 21 is rotatably supported within and by the bearings 11 and 12, said bearing 12 being retained between a shoulder on said sleeve and a shoulder on the retainer 8 and the bearing 11 being retained between a shoulder on said retainer 9 and a washer 22 which latter is in turn held on the sleeve 21 by a nut 23. The input sleeve 21 is internally splined for purposes appearing hereinafter and has a radially extending flange 24 near its rightward end.

An input shaft 26 is externally splined and is received into the splining of, and is supported on and by, the input sleeve 21. An O-ring 27 is located near the rightward end of the input shaft 26 and within a circumferentially aligned row of openings through the internal splines of the sleeve 21 between said shaft and the internal surface of the input sleeve 21 to act as a grease seal.

Extending radially inwardly from the central section 4 of the casing 1, and in this embodiment integral therewith, is a partition 31, said partition extending to a point relatively close to the central zone of the transmission structure. A bearing 30 is located at the radially inward edge of said partition 31 and is held in place by a lock ring 33 which in turn is held in position by a cap 34. Said cap is fastened to the partition by a series of screws of which one is indicated at 36. A grease seal 35 is provided on said cap 34 for purposes appearing hereinafter. The inner race 32 of said bearing 30 rotatably supports the sleeve portion 37 of a ring gear carrier 38, said inner bearing race being held at its rightward end against a shoulder located near the rightward end of said sleve portion 37 and being held at its leftward end by a snap ring 39. A radially extending flange 43 is located at the rightward end of said sleeve portion 37 and is provided at its periphery with a plurality of splines 46. An internally toothed ring gear 44 is received into said splines 46 and is held in place by a suitably segmented ring 47 fitting into a circumferential groove 45 within the splines 46 and a series of cap screws of which one appears at 47a.

The leftward end of said sleeve 37 is provided externally with a plurality of splines 41, whose purpose will appear hereinafter and is further provided internally with a grease seal 42 whose purpose will appear hereinafter.

The internal wall of said sleeve 37 carries two rows of roller bearings 48 and 49, which roller bearings are anchored in place in any convenient manner. Within said roller bearings is supported the sleeve portion 51 of the forward planet gear carrier 52, said planet gear carrier having a radially extending flange 53 at its rightward end, which flange carries an axially extending stud 54 near its periphery. Said stud carries a bearing 56 which is held at one end against the flange 53.

An output shaft 61 is supported within and by the internal race of the rearward bearing 14 and is provided with external splining in the usual manner. Said output shaft has at its inward end a flange 62 which is radially coextensive with the flange 53 and constitutes a rearward planet carrier. The flange 62 has suitable openings therein for receiving the stud 54 therethrough and said stud is held in position by a suitable lock ring 63, preferably segmented for ease in assembly, and said ring is in turn held in position by a series of cap screws of which one appears at 64. The spacing of the parts is such that when said cap screws are tightened, the bearing 56 will be held snugly between the flanges 53 and 62.

The planet gear 58 is supported on the bearing 56 and is in toothed engagement with the ring gear 44.

Other studs 54 are provided as desired between the flanges 62 and 53 and are similarly provided with planet gears which are also in engagement with the ring gear 44.

92, and said plates are released by rightward pressure applied to the movable end ring 104 by a rightwardly directed force applied to the leftward ends of the connectors 106 by means hereinafter described.

Turning now to the other group of plates, namely those connecting the housing with the plate carrier 83 and through it to the ring gear 44, attention is again directed to FIGURES 2, 7, 8 and 9.

Figures 7, 8:
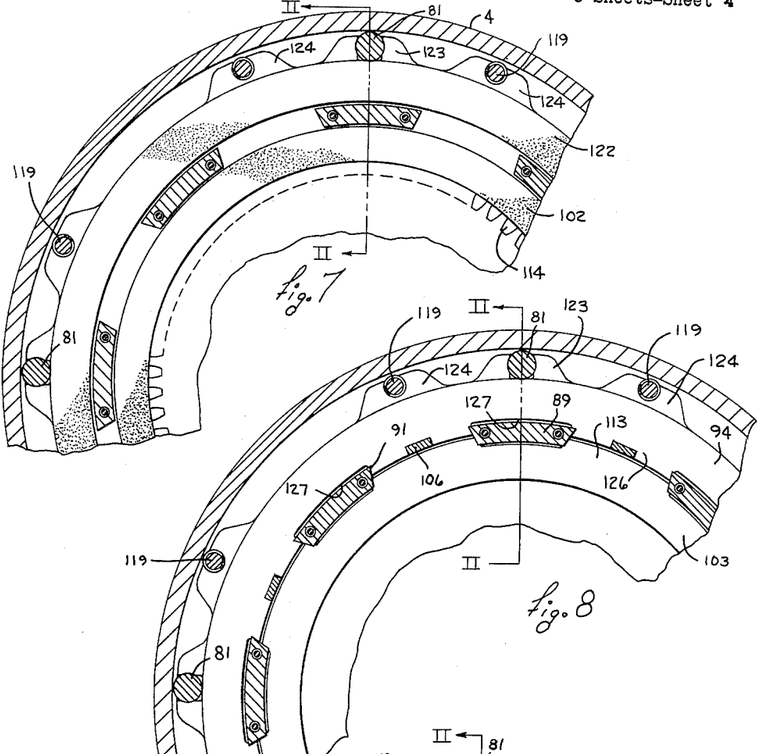
FIGURE 7 is a fragmentary section taken on the line VII—VII of FIGURE 2.
FIGURE 8 is a fragmentary section taken on the line VIII—VIII of FIGURE 2.
Figure 9:
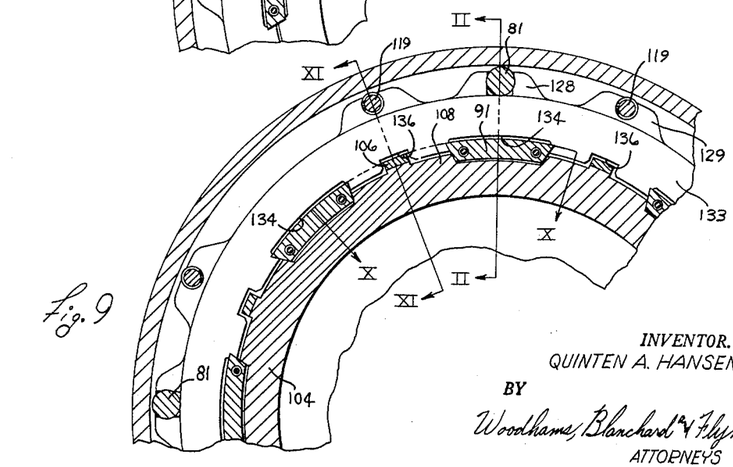
FIGURE 9 is a fragmentary section taken on the line IX—IX of FIGURE 2.

A plurality of pins 81 are received into suitable openings in the forward housing 2 and the central housing 4 and are spaced circumferentially as indicated in FIGURES 7, 8 and 9. This spacing is a matter of choice but it will be found convenient to provide for such pins spaced 90 degrees apart. Part of the outer group of brake plates is arranged to engage said pins and the remainder is arranged to engage the plate carrier 83.

Figures 10, 11:
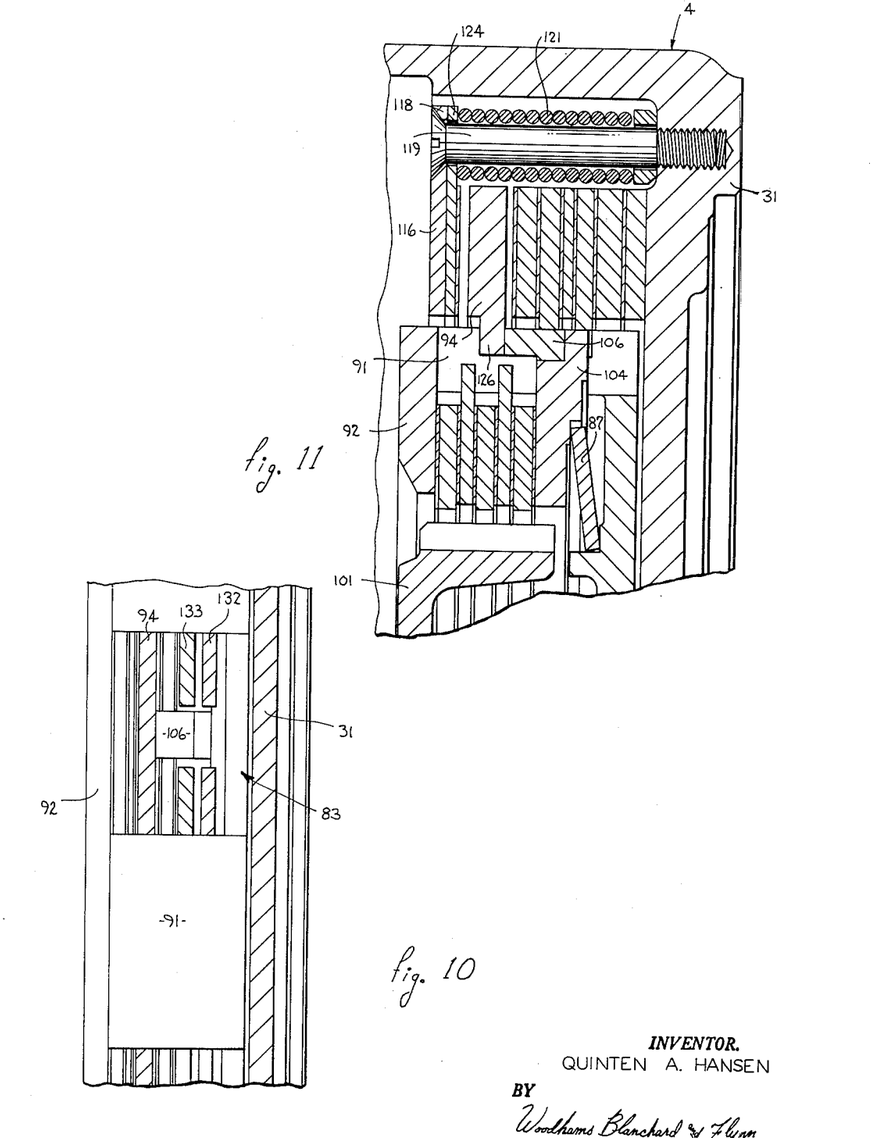
FIGURE 10 is a fragmentary section taken on the line X—X of FIGURE 9 and further indicated by the line X—X of FIGURE 2.
FIGURE 11 is a fragmentary section taken on the line XI—XI of FIGURE 9.

The forwardmost (leftwardmost) plate 116 is made relatively thick axially to act as a pressure plate by which force from the piston 141 is transmitted to the brake plates. It has a plurality of radially extending lugs 117 (FIGURE 2) which embrace the pins 81 for holding said plate against rotation with respect to said pins, and accordingly with respect to said housing, but for permitting axial movement of said plate 116 with respect to said pins. Said plate 116 also has further radially extending lugs 118 (FIGURE 11) through which are received a plurality of screws 119 arranged axially with respect to the apparatus and received into the partition 31. Springs 121 surround each of the screws 119 and constantly urge the plate 116 leftwardly and thereby constantly urge a release of the brake plates.

The next rearwardly positioned plate 122 is of a pattern similar to the plate 116 and is illustrated in FIGURE 7. It has radially extending lugs 123 for engaging the pins 81 by which said plate is held against rotation with respect to the housing but it is permitted to slide axially with respect to said pins. Said plates 122 also have lugs 124 embracing the screws 119.

The next rearwardly positioned part 94 (FIGURES 2 and 8) is of substantial axial thickness to act as a pressure-transferring means in a manner hereinafter appearing. It has no connection with the pins 81 or the screws 119 but is provided with inwardly directed lugs 126 (FIGURES 8 and 11) which are positioned between the plate carrying sections 91 of the plate carrier 83. Said lugs 126 define recesses 127 into which said plate-carrying sections 91 are received, whereby to hold the plate 94 against rotation with respect to the plate carrier 83 by permitting axial movement with respect thereto.

A further plurality of plates, three in this embodiment, are of substantially similar construction although for strength purposes the respectively axially outermost of these plates, namely, the plates 82 and 82b, are made somewhat thicker than the center plate 82a. Each of said plates is of the same pattern as are the others and is provided with lugs appearing in FIGURE 9 as the lug 128 connecting said plate 82 to the pins 81 and the lugs 129 connecting said plate 82 to the screws 119. Lugs 128a and 128b together with the lugs corresponding to the lugs 129 of plate 82 are provided also on the plates 82a and 82b. An end plate 131 having lugs associating it with pins 81 is provided at the rightward extremity of the outer group of plates as an end pressure plate.

Inwardly held plates 132 and 133 are arranged as shown between the outwardly held plates and are provided with recesses 134 (FIGURE 9) for the reception of the plate-carrying sections 91 in a manner similar to the recess 127 above discussed in connection with the plate 94. However, the plates 133 and 132 have further recesses 136 (FIGURE 9) to provide clearance for the connectors 106.

A piston 141 (FIGURES 1 and 2) is located within the forward housing 2 and slides in part on its hub 142 and in part on its outer flange 143. Seals 144 and 146 are provided to prevent the escape of air from within the piston chamber. Pressure fluid, usually compressed air, is introduced from a conduit 147 through an opening 148 into the chamber 149 for urging said piston rightwardly. The rightward edge of flange 143 bears against the leftwardmost outer clutch plate 116 for urging it rightwardly in a manner hereinafter described.

*Operation*

While the operation of the apparatus has been somewhat indicated above, it will be reviewed in detail to insure completeness and clarity in understanding of the invention.

Power applied to the input shaft 26 is applied through the sleeve 21 to the plate carrier 101, and thence, when the inner group of clutch plates are compressed together, through said group of plates to the movable plate carrier 83. Force then travels from said movable plate carrier 83 through the splining 41 to the sleeve 37, thence to the ring gear carrier 38 and to the ring gear 44. The planet gears are arranged to rotate with respect to the ring gear carrier 44 but are connected by the spider 62 to the output shaft 61.

At the same time, through the spline connection from the input shaft 26 to the sleeve 21 and thence to the sun gear shaft 66, the sun gear 67 is caused to rotate with the input shaft. Thus, with both ring gear and the sun gear rotating with the input shaft, the planet gears will orbit about the sun gear axis and the output shaft will rotate at the same speed as the input shaft.

Alternatively, with the inner set of plates released and the outer set of plates engaged, the plate carrier 83 and hence the ring gear 44 will be held fixedly with respect to the housing and hence against rotation. Thus, with the sun gear remaining connected to the input shaft through the sleeve 21, the planet gears and hence the output shaft 61 will be rotated at a reduced ratio depending in a known manner upon the relative sizes of the sun gear and the planet gears. Therefore, it will be seen that the system will effect a direct drive when the inner set of clutch plates are connected and the outer set are disconnected and will effect a ratio drive when the inner set of plates are disconnected and the outer set of plates are connected.

The pressure of the spring 87 will urge the end ring 104 leftwardly and thus tend constantly to urge the inner set of clutch plates into engagement with each other. Simultaneously, the urging of the springs 121 will urge the outer set of plates apart. Thus, in the embodiment herein shown the normal position of the transmission will be a direct drive position.

Assuming now that pressure fluid is introduced into the conduit 147 and thence into the chamber 149, the piston 141 will be urged rightwardly. As the plate 122 contacts the plate 94 and bearing in mind that the leftward end of the connector 106 is already in contact (FIGURE 11) with the rightward surface of the plate 94 by virtue of the pressure of the spring 87, it will be understood that pressure will be transmitted from said plate 94 through the connectors 106 thence to the end ring 104 to push it rightwardly, whereby to compress the spring 87 and release the connection of the inner plates. At the moment this happens, the outer plate 122 will have already effected a frictional relationship with the plate 94 and hence some tendency for holding the ring gear 44 in stationary position will have been initiated before the inner clutch plates are released. However, since at the moment the end ring 104 is moved in response to movement of the plate 94, the remainder of the outer plates have not yet been engaged, the full force for holding the ring gear 44 in stationary position has not yet become effective.

As the plate 94 continues moving rightwardly in response to pressure from the piston 141, it engages the plate 82 and urges same rightwardly thereby compressing the remainder of the outer group of plates against the end ring 131 and the partition 31 and simultaneously continuing the release of the inner group of clutch plates. Thus, the inner group of clutch plates are released and the The flanges 62 and 53 are held together rigidly with respect to each other by any convenient means, not shown, which may include, for example, suitable spacers and bolts arranged therebetween at points circumferentially interspersed between the planetary gears. Thus, said flanges are held rigidly together in proper alignment for the reception of said studs 54 and orbital movement of said planet gears will result in rotation of the output shaft 61.

A sun gear shaft 66 is externally splined and is received into the internal splining of the input sleeve 21. Said sun gear shaft 66 supports a sun gear 67 which is externally toothed and is in mesh with the several planet gears. Said sun gear is closely held between the flanges 53 and 62 but is spaced therefrom by suitable low friction spacers of which two appear at 68 and 69 and two appear at 71 and 72.

Turning now to the clutch structure, by which the gearing of the planetary system is controlled, it will be observed that all of this structure is to the left of the partition 31 and to the left of the grease seals 35 and 42. Thus, the clutch structure is isolated from the lubricant provided for the gears and the improved frictional characteristics above-mentioned are thereby obtained.

A series of pins 81 extend between the forward and central portions of the casing and retain a plurality of frictional plates 82 in a manner as hereinafter described. Said plates 82 are made from, or coated with, any material providing a high coefficient of friction and are generally circular and have external notches therein for embracing the several pins 81. Thus, said plates may move axially with respect to the transmission casing but are held against movement circumferentially with respect thereto.

The ring gear movable plate carrier 83 is provided with a relatively small sleeve 84 at its inward end which in turn is provided with internal splines engaging with the above-mentioned splines 41. A snap ring 80 holds the supporting sleeve 84 of said carrier 83 against leftward movement with respect to the splines 41 and a further snap ring 85 at the rightward end of said sleeve 84 holds said carrier 83 against rightward movement with respect to the splines 41. Thus, the carrier 83 is locked firmly onto and for rotation with the sleeve 37.

Radially outwardly of said sleeve 84 is a shoulder 86 which carries a resilient and somewhat conically-shaped spring 87, whose further construction and function will appear in more detail hereinafter. At the radially outer edge of said carrier 83 there is provided a plurality of plate-carrier sections 91 and a back-up ring or reaction means 92. A plurality of movable plates of which one is indicated at 94, and whose details will be set forth hereinafter, are carried on said plate carrier sections 91 in a manner permitting axial movement of said plates with respect to said plate carrier 83 but preventing circumferential movement with respect thereto.

A sun gear clutch plate carrier 101 is affixed, here riveted, to the outer edge of the flange 24 and extends further radially outwardly to a point close to but radially inward from the carrier sections 91. Its outer periphery is splined and carries a plurality of sun gear clutch plates 102, said sun gear clutch plates being arranged on said spline for axial movement with respect thereto but being held against circumferential movement with respect thereto. A further plurality of plates 103 are interleaved with said plates 102 and are mounted on the carrier sections 91 in a manner to permit axial movement with respect thereto but to prevent circumferential movement with respect thereto.

A movable end ring 104 is supported at the rightward end of the sun gear clutch plates and has a shoulder 112 receiving the periphery of the spring 87. A connector 106 (FIGURE 11) whose details will be described hereinbelow, is mounted at the periphery of the movable end ring 104 and extends forwardly to contact the rightward surface of one of the movable plates 94 of the ring gear brake unit 95. In this particular embodiment said connector 106 is contacting the leftwardmost of the plates 94 but as will become apparent as the description progresses, this is a matter of choice and it may contact instead a different one of said plates 94.

Now turning to the details of the construction of the clutch and brake parts, shown only generally in FIGURE 1 and referring particularly to the sections 91, the movable end ring 104, the connector 106 and certain ones of the movable brake plates 94, attention is now directed to FIGURES 2 to 11, inclusive.

Figures 2, 3:
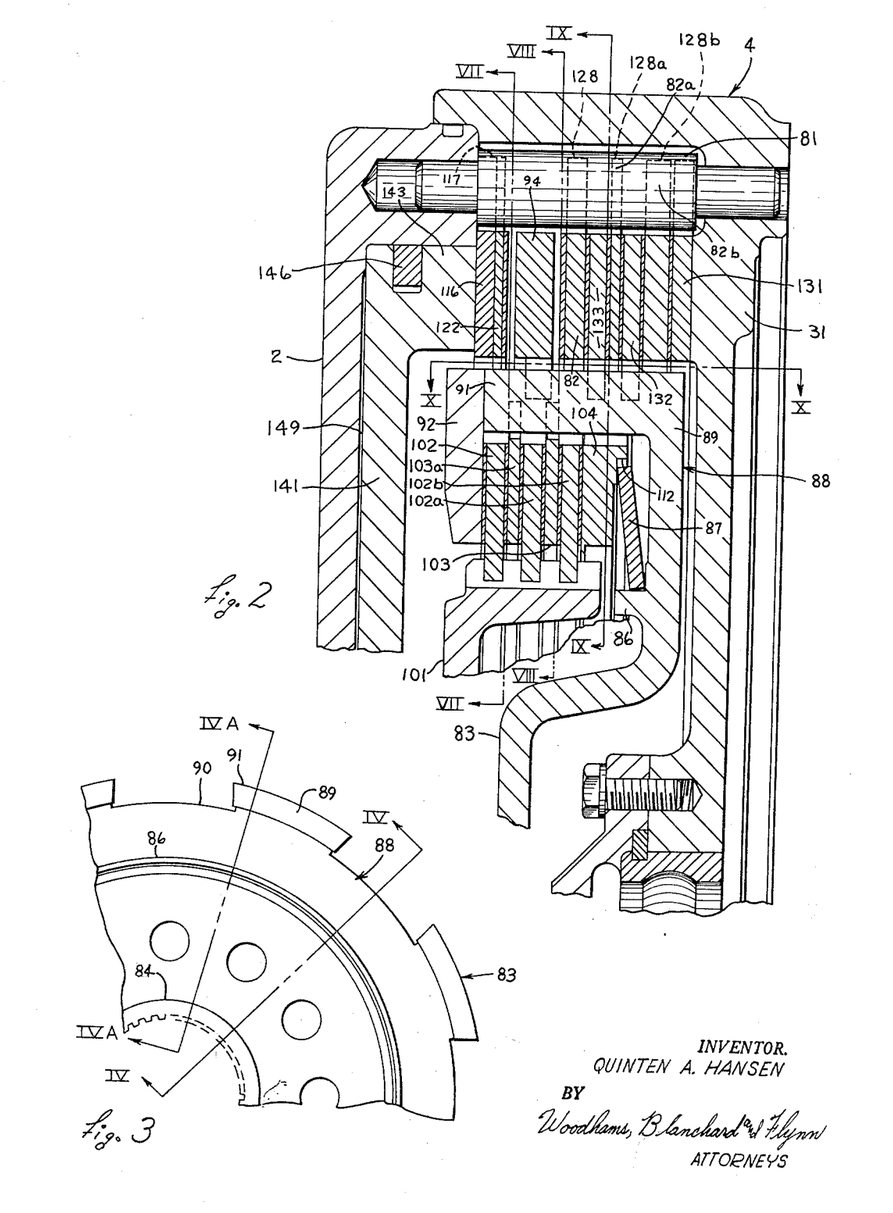
FIGURE 2 is a fragmentary portion of FIGURE 1 showing the parts on an enlarged scale.
FIGURE 3 is a fragmentary end elevation of the clutch plate carrying member of the transmission.

Reference is first made to FIGURE 2 wherein the clutch and brake portion of the structure shown in FIGURE 1 appears on an enlarged scale for clarity of illustration. Said FIGURE 2, as well as FIGURE 1, will as the description progresses be recognized as having been taken on a plane indicated by the lines II—II of each of FIGURES 7, 8 and 9.

Figure 4:
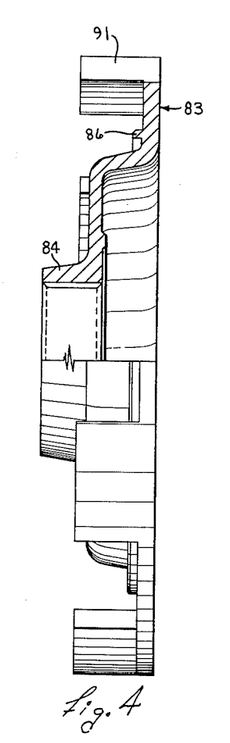
FIGURE 4 is a side elevation, partially in central section of said clutch plate carrying member, the sectional portion being taken on the line IV—IV of FIGURE 3.
Figure 4A:
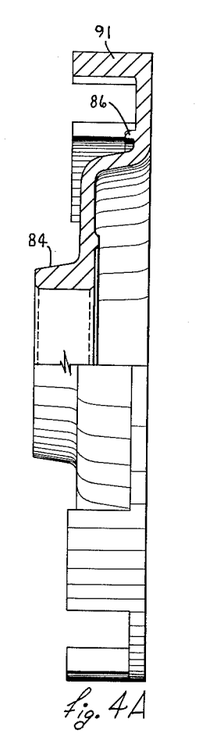
FIGURE 4a is a side elevation, partially in section of the clutch plate carrying member, the sectional portion being taken on the line IVA—IVA of FIGURE 3.

Referring now to the details of some of the parts which are shown as assembled in FIGURES 1 and 2, reference is first made to FIGURES 3 and 4, wherein there is shown the detailed construction of the movable plate carrier 83. The hub 84 by which said movable plate carrier is mounted further appears in FIGURES 3 and 4 and clearly shows the inner spline by which said movable plate carrier is affixed to the splining 41 of the sleeve 37. The shoulder 86 also appears in FIGURES 3 and 4 upon which the spring 87 is supported. The plate carrier sections 91 are best shown in FIGURES 2, 3 and 4 as a plurality of spaced axially extending lugs 89 between which are a plurality of spaces 90 for purposes hereinafter appearing.

Figure 5:
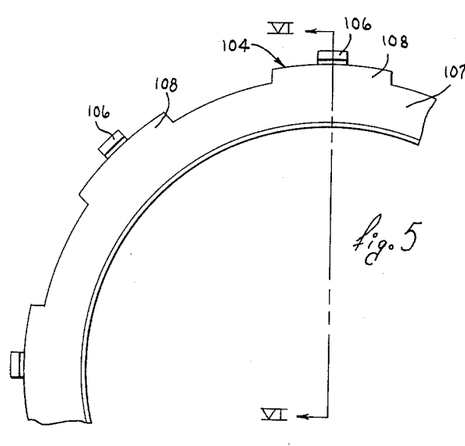
FIGURE 5 is a fragmentary end elevation of the force transmitting member comprising a portion of the transmission shown in FIGURE 1.
Figure 6:
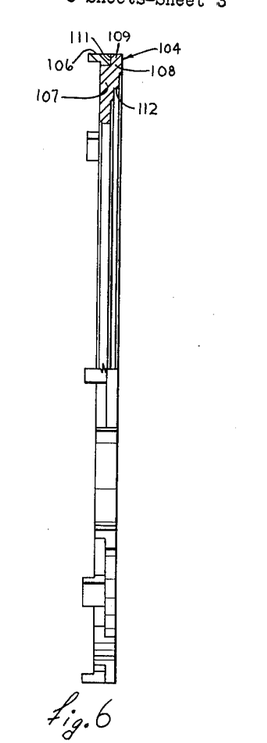
FIGURE 6 is a side elevation partially in section as the force transmitting member, the sectional portion being taken on the line VI—VI of FIGURE 5.

Turning now to the movable end ring 104, attention is directed to FIGURES 5 and 6. Said end ring 104 comprises essentially a base ring portion 107 having a plurality of axially off-set radially extending spaced lugs 108. Each of said lugs 108 has an upstanding portion 109 (FIGURE 6) defining a notch 111 at its forward (leftward as appearing in FIGURE 6) side. Within each of said respective notches so formed is positioned the connector 106, each thereof being of substantially L-shape and being fastened in place by any suitable means, such as welding. The movable end ring 104 and the ring gear plate carrier 83 are associated together as best shown in FIGURE 9 by inserting the lugs 108 in the spaces 90 between the plate carrier sections 91 and moving the movable end ring 104 rightwardly with respect to the plate carrier 83 until the radially outer edge of the spring 87 engages the rearward (rightward) face of the ring 107 immediately below the shoulder 112 as shown in FIGURE 2.

The plates 103 and 103a are identical and are sufficiently described by a description of the plate 103, the same being shown in FIGURE 8. Said plate 103 is provided with a plurality of upstanding lugs 113 which are inserted between the plate carrier sections 91 by which the plates 103 and 103a are held against rotation with respect to the plate carrier 83.

The power input connected plates or sun gear clutch plates are indicated by the numerals 102, 102a and 102b, and the plate 102 is illustrated in FIGURE 7. These are each provided with teeth 114 on the radially inner edges for cooperation with the external teeth on the plate carrier 101 by which said plates are centered with respect to the axis of the plate carrier 101 and held nonrotatably with respect thereto.

The back-up ring or reaction means 92 is affixed to the forward, (leftward) ends of the plate carrier sections 91 and limits leftward movement of the plates thus far described. Thus, the spring 87 urges the movable end ring 104 leftwardly to tighten the inner group of plates against each other and against the back-up ring or reaction means outer group of plates are compressed and there is provided a moderate degree of overlapping to insure against there being any lag, even momentarily, in the transmission of power through the gear system.

When it is desired to restore the gear system to direct drive condition, the fluid pressure in the line 147 is released in any convenient manner and the spring 87 together with the springs 121 restore the clutch and brake to their normal position as above described. Here again, the pressure of the spring 87 will maintain contact between the outer plates 94 and 122 until the inner group of plates are fully compressed and leftward motion of the end ring 104 terminates. At that point, continued leftward motion of the outer plate 122 in response to the springs 121 will separate said plate 122 from the plate 94 and thus all tendency for holding the ring gear 44 in stationary condition will terminate but such termination will occur only after the inner clutch plates are all fully engaged.

While in the present embodiment the only contact effected in the outer brake group prior to the release of the inner clutch group is between the single pair of plates 122 and 94, it will be recognized that the same principles may be employed in an apparatus effecting engagement of more than one pair of plates in the outer group prior to the release of the clutch plates in the inner group. This may be readily accomplished by providing more space forwardly of the plate 94 and introducing as many pairs of plates, corresponding to plates 94 and 122, as are desired between the end ring 116 and the plate 94, whereby as much connection as may be desired can be created between the plate carrier 83 and the pins 81 prior to the release of the inner group of clutch plates. Such overlappings as may be provided in response to application of pressure to the piston 141 will, for the reasons already above set forth, exist also when said pressure is released and the parts returned to their normal direct drive condition. This modification will however increase somewhat the length of the apparatus, and is undesirable to that extent.

As a further possibility for increasing the amount of overlap, assuming that the total brake discs shown are adequate to effectively brake the ring gear, is to shorten the connectors 106 on the end ring 104 and then cause them to contact the plate 133 (FIGURE 2), by way of example, rather than the plate 94 as shown in the embodiment here utilized. This will not increase the overall length of the unit but it will increase the percentage of overlap.

While a particular preferred embodiment of the invention has been described above, it will be understood that the invention contemplates such changes or modifications therein as lie within the scope of the appended claims.

What is claimed is:

1. A planetary transmission comprising:
a hollow casing;
a partition stationarily mounted on said casing and extending thereacross between the axial ends thereof, said partition defining with said casing a gear chamber and a control chamber which are coaxial, adjacent each other and separated by said partition, said partition having a central opening coaxial with said chambers;
an input shaft and an output shaft;
sun, planet and ring gears operably supported within said gear chamber for rotation with respect to said casing;
a brake and a clutch supported within said control chamber, one side of said brake being non-rotatably mounted on said casing, one side of said clutch being drivingly connected to one of said shafts;
means connected to the other side of both said brake and said clutch and extending through said central opening and connected to said ring gear;
means connected to said one shaft and extending through said central opening and connected to one of said sun gear and said planet gears; and
means connecting the other shaft to the other of said sun gear and said planet gears.

2. A planetary transmission according to claim 1, in which said means connected to the other side of both said brake and said clutch and to said ring gear includes:
a first substantially radially extending portion within said control chamber disposed closely adjacent to and extending substantially parallel with said partition, said first portion being connected to the other side of said clutch and said brake;
a second substantially radially extending portion within said gear chamber disposed closely adjacent to and extending substantially parallel with said partition, said second portion being connected to said ring gear; and
a third, annular portion extending coaxially through said central opening and connected to the radially innermost parts of said first and second portions for effecting simultaneously rotation thereof.

3. A planetary transmission according to claim 2 including a bearing means supported between said partition and said third portion and a lubricant seal mounted on said partition and located within said control chamber and sealingly engaging said third portion.

4. A planetary gear transmission, comprising:
a housing;
coaxial input and output shafts;
a planetary gear set including a sun gear connected for rotation with one of said shafts, a rotatable ring gear and planet gear means connected for rotation with the other shaft;
an axially extending, annular, ring gear plate carrier connected for rotation with said ring gear, said plate carrier being axially spaced from and being located entirely to one axial side of said ring gear, a first set of brake plates extending radially outwardly from said carrier and a first set of clutch plates extending radially inwardly from said carrier, both sets of plates being movable axially with respect to said carrier and being held against circumferential movement with respect thereto;
a second set of brake plates interleaved with said first set of brake plates and mounted on said housing for axial movement with respect to said housing but being held against circumferential movement with respect thereto;
an annular clutch plate carrier located within said ring gear plate carrier and connected to said one shaft;
a second set of clutch plates interleaved with said first set of clutch plates and mounted on said clutch plate carrier for axial movement with respect to said clutch plate carrier but being held against circumferential movement with respect thereto;
reaction means stationarily mounted on said ring gear plate carrier engageable with an end one of said clutch plates and resiliently impelled means on said gear plate carrier engageable with the other end one of said clutch plates for urging said clutch plates into engagement; and
operator energizable means effective for disengaging said clutch plates and effecting engagement of said brake plates.

5. A planetary gear transmission, according to claim 4 including a connector extending from an intermediate one of said brake plates to said resiliently impelled means so that movement of said brake plates into frictional engagement will first engage a portion of said brake plates while said clutch plates are still frictionally engaged and then further axial movement of said brake plates will effect axial movement of said connector and thereby said resiliently impelled means to release said clutch plates from frictional engagement.

6. A planetary gear transmission, comprising in combination:
   a housing;
   input and output shafts extending into said housing;
   a planetary gear set including a sun gear connected for rotation with one of said shafts, a rotatable ring gear and planet gear means connected for rotation with the other shaft;
   an axially extending plate carrier arranged nonrotatably with respect to said ring gear and axially spaced therefrom;
   an outer set of brake plates arranged outwardly of said carrier and related thereto for permitting axial motion with respect thereto but preventing circumferential motion with respect thereto;
   an inner set of clutch plates extending radially inwardly from said carrier and arranged thereon for axial motion with respect thereto but held against circumferential motion with respect thereto;
   a second set of brake plates interleaved with said outer set of plates and arranged on and with respect to said housing for axial motion with respect thereto but being held against circumferential motion with respect thereto;
   a second set of clutch plates interleaved with the inwardly extending portions of said first clutch plates and a second carrier supporting said second set of clutch plates for axial movement with respect thereto but held against circumferential motion with respect thereto;
   means connecting said second carrier with said one shaft;
   resiliently impelled means normally urging said clutch plates into frictional engagement with each other and simultaneously holding said brake plates out of frictional engagement with respect to each other, said resiliently impelled means including a connector connected to one of said inner set of clutch plates and extending to one of said outer set of brake plates, said connector being acted on by said resiliently impelled means and being mounted on and for rotation with said plate carrier and normally urging said one of said outer set of brake plates toward one plate of said second set of brake plates whereby said last-named brake plates will be brought into engagement before said sets of clutch plates are disengaged; and
   operator energizable means for disengaging said clutch plates and effecting engagement between said brake plates.

7. A planetary gear transmission, comprising in combination:
   a housing;
   input and output shafts extending into said housing;
   a planetary gear set including a sun gear connected for rotation with one of said shafts, a rotatable ring gear and planet gear means connected for rotation with the other shaft;
   an axially extending plate carrier arranged nonrotatably with respect to said ring gear and axially spaced therefrom;
   an outer set of brake plates arranged outwardly of said carrier and related thereto for permitting axial motion with respect thereto but preventing circumferential motion with respect thereto;
   an inner set of clutch plates extending radially inwardly from said carrier and arranged thereon for axial motion with respect thereto but held against circumferential motion with respect thereto;
   a second set of brake plates interleaved with said outer set of plates and arranged on and with respect to said housing for axial motion with respect thereto but being held against circumferential motion with respect thereto;
   a second set of clutch plates interleaved with the inner set of first clutch plates and a second carrier supporting said second set of clutch plates for axial movement with respect thereto but held against circumferential motion with respect thereto;
   means connecting said second carrier with said one shaft;
   resiliently impelled means normally urging said clutch plates into frictional engagement with each other and simultaneously holding said brake plates out of frictional engagement with respect to each other, said resiliently impelled means including a connector mounted on one of the plates of said inner set of clutch plates and extending toward and into contact with one of the plates of said outer set of brake plates whereby a force urging said second set of brake plates together will first urge together that portion of said second set of brake plates between said one plate of said outer set of brake plates and the point at which said force is applied and said force will then be transmitted to said inner set of said clutch plates for releasing same from said second set of clutch plates before the engagement of said second set of brake plates and said outer set of brake plates is completed.

8. A transmission assembly comprising:
   a housing;
   a first shaft in said housing;
   a second shaft in said housing coaxial with said first shaft;
   an intermediate shaft between said first and second shafts and drivingly connected to said first shaft;
   a sun gear mounted on said intermediate shaft;
   a plurality of planet gears meshed with said sun gear;
   a planet gear carrier rotatably supporting said planet gears and being connected to said second shaft;
   a ring gear surrounding and meshed with said planet gears;
   a ring gear carrier supporting said ring gear and including a sleeve surrounding said intermediate shaft;
   a plate carrier drivingly connected to said sleeve, said plate carrier having a first set of brake plates mounted thereon and a first set of clutch plates mounted thereon;
   a clutch plate carrier drivingly connected to said first shaft and carrying a second set of clutch plates interleaved with said first set of clutch plates;
   a second set of brake plates carried by said housing and interleaved with said first set of brake plates; and
   means for alternately engaging said sets of clutch plates and said sets of brake plates, said last-named means including resilient means for normally holding engaged one of the group consisting of said sets of brake plates and said sets of clutch plates and for normally holding disengaged the other of said group consisting of said sets of brake plates and said sets of clutch plates;
   means for overcoming said resilient means;
   a connector extending between one of said first set of brake plates and one of said first set of clutch plates and acted on by said resilient means to urge one brake plate of said first set into engagement with a brake plate of said second set while at the same time holding said sets of clutch plates in engagement with each other whereby at least a portion of said clutch plates and said brake plates will momentarily be engaged during the time when the conditions of engagement thereof are being reversed.

9. The device defined in claim 2 wherein said clutch and brake includes a plate carrier mounted on said first portion and having first friction means carried thereon, a portion of said first friction means extending radially outwardly and a portion of said first friction means extending radially inwardly, said one side of said brake comprising second friction means arranged radially outwardly of said first friction means between a radially extending portion of said casing and said partition and frictionally engageable with said outwardly extending portion of said first friction means and nonrotatably mounted on and with respect to said casing, and said one side of said clutch comprising third friction means arranged radially inwardly of said first friction means, mounted upon and nonrotatably with respect to said one shaft and frictionally engageable with the inwardly extending portion of said first friction means; operator selectable means effecting engagement of said first friction means with one of said second and third friction means; whereby to connect said ring gear with one of said one shaft and said casing.

10. The device defined in claim 9 wherein the second friction means includes a plurality of friction surfaces and means are provided between said first friction means and said second friction means and between said first friction means and said third friction means for effecting engagement between said first friction means and a portion of said second friction means while said first friction means is engaging said third friction means and for thereafter disengaging said first and third friction means and then effecting engagement of the first friction means with the entirety of said second friction means.

11. A transmission assembly comprising: a housing; a first shaft in said housing; a second shaft in said housing coaxial with said first shaft; an intermediate shaft between said first and second shafts and drivingly connected to said first shaft; a sun gear mounted on said intermediate shaft; a plurality of planet gears meshed with said sun gear; a planet gear carrier rotatably supporting said planet gears and being connected to said second shaft; a ring gear surrounding and meshed with said planet gears; a ring gear carrier supporting said ring gear and including a sleeve surrounding said intermediate shaft; a plate carrier drivingly connected to said sleeve, said plate carrier having a first set of brake plates mounted thereon and a first set of clutch plates mounted thereon, said plate carrier and said ring gear carrier having radially extending portions extending toward said sleeve, a stationary, radially extending partition secured to said housing and extending adjacent said sleeve, said partition being disposed between and being closely adjacent said radially extending portions of said carriers; a clutch plate carrier drivingly connected to said first shaft and carrying a second set of clutch plates interleaved with said first set of clutch plates; a second set of brake plates carried by said housing and interleaved with said brake plates, said second set of brake plates being disposed between a radially extending portion of said housing and said partition; and means for alternately engaging said sets of clutch plates and said sets of brake plates.

References Cited in the file of this patent

UNITED STATES PATENTS

| | | |
|---|---|---|
| 2,170,733 | Sharpe | Aug. 22, 1939 |
| 2,246,673 | Glasner et al. | June 24, 1941 |
| 2,427,168 | Thompson et al. | Sept. 9, 1947 |
| 2,507,050 | Roberts | May 9, 1950 |
| 2,540,965 | Schellinger | Feb. 6, 1951 |
| 2,631,477 | Ball | Mar. 17, 1953 |
| 2,649,817 | La Vogue | Aug. 25, 1953 |
| 2,739,789 | Smith | Mar. 27, 1956 |
| 2,870,655 | Rockwell | Jan. 27, 1959 |
| 2,918,832 | Meyers | Dec. 29, 1959 |

FOREIGN PATENTS

| | | |
|---|---|---|
| 844,541 | Germany | July 21, 1952 |
| 493,549 | Canada | June 9, 1953 |